April 27, 1965     G. CAROLI ETAL     3,180,571
HYDRAULIC CLUTCH
Filed Nov. 15, 1960
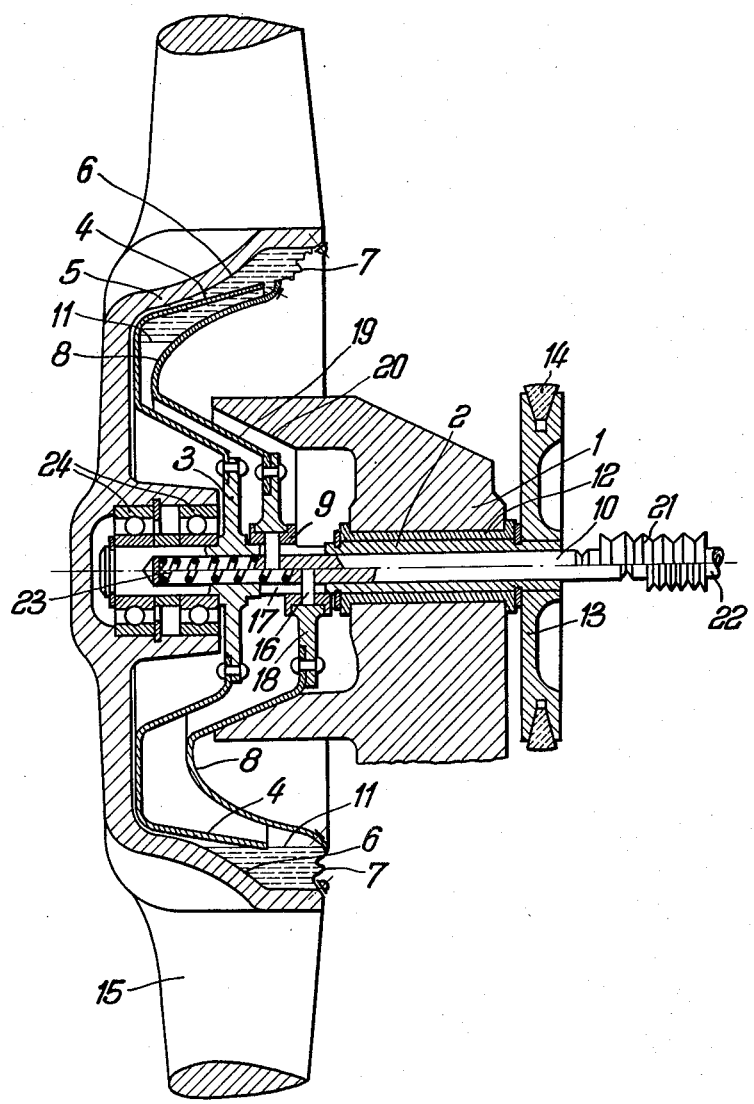
Inventors
Gerhard Caroli and Otto Lutz
By Alvin Browdy
Attorney

United States Patent Office 3,180,571
Patented Apr. 27, 1965

3,180,571
HYDRAULIC CLUTCH
Gerhard Caroli, 8 Mauserstrasse, Stuttgart-Feuerbach, Germany, and Otto Lutz, 53 Bienroder Weg, Braunschweig, Germany
Filed Nov. 15, 1960, Ser. No. 69,392
Claims priority, application Germany, Nov. 16, 1959,
L 34,719
6 Claims. (Cl. 230—270)

This invention relates to a hydraulic clutch mechanism having a driving member and a driven member for the transmission of power and more specifically to a hydraulic clutch device adapted for infinitely variable regulation of speed.

It is well known in the art to utilize hydraulic clutches having two opposing rotatable discs with circular interleaved protrusions of tapering cross-section located thereon so as to enable the circular protrusions of one disc to enter the spaces between the circular protrusions of the other disc as the discs are moved axially towards or away from each other in a high viscosity oil medium. The adhesive or cohesive action of the liquid will cause the driven disc of the hydraulic clutch to rotate with the driving disc.

It is further known to keep the interval between the driving disc constant and to change the quantity of oil in the hydraulic coupling by means of a pump. The interval of the inner free top surface of the oil ring which is formed during operation of the hydraulic clutch due to centrifugal force is changed in its radial direction from the axis of revolution by the pump action, whereby the wetted surface and correspondingly the transferred torque is changed or controlled.

An object of the present invention is to provide an operating hydraulic clutch with an oil ring, but without the necessity of a pump.

A further object of the invention is to provide a hydraulic clutch with which it is possible to achieve a control characteristic as straight as possible.

It is a further object of this invention to provide a hydraulic clutch of small size which will permit with slight adjustment a control throughout the regulating range.

It is still a further object of the invention to provide a hydraulic clutch which is especially adapted for driving the fan for the cooling system in a combustion engine running at constant or variable speed, preferably a combustion engine operating as the driving engine of a motor vehicle.

It is an additional object of this invention to provide a hydraulic clutch which can control the speed of the machine from zero to maximum speed of the driving engine.

Additional objects of this invention will be apparent from the following specification.

In the drawings:

The figure is a longitudinal sectional view of the hydraulic clutch and connected fan wherein the upper half of the figure illustrates the position of the hydraulic clutch when engaged and the bottom half of the figure illustrates the position of the hydraulic clutch when disengaged.

Briefly, the invention comprises a control for the driven mechanism of a hydraulic clutch used for the transmission of power. The hydraulic clutch comprises a housing and a first and a second rotatable member mounted substantially coaxial with respect to each other within the housing. Driving means are provided for rotating the first rotatable member. Liquid means are disposed between the rotatable members for actuating rotation of the second rotatable member upon rotation of the first rotatable member. Means are also provided for axially moving the second rotatable member into and out of engagement with the first rotatable member. The second rotatable member is provided with attaching means for moving said liquid means between said first and said second rotatable members upon axial movement of said second rotatable member.

Referring more specifically to FIG. 1, a hollow driving shaft 2 is permitted rotation by a conventional bearing 12 which is mounted between said hollow driving shaft 2 and a fixed pillar 1. Provided at one end of the shaft 2 is an integrally connected belt wheel 13 which is driven by a V-belt 14 from any desired driving mechanism such as the engine of an automobile (not shown).

A radial flange 3 is integrally fixed to the other end of the hollow shaft 2. Attached to the flange 3 is a disc 4 whose function will be discussed below.

At the free end of the driving shaft 2 a housing 5 is located which is permitted rotation by conventional ball bearings 24. The housing 5 could, for example, form the hub of a fan 15. Mounted on the hollow driving shaft 2 is a ring 9 which is movable with regard to the axis of the shaft 2. The axial movement of the ring 9 is caused by the axial movement of inner shaft 10 which is located within the hollow driving shaft 2.

A connecting stud 16 is provided to connect the ring 9 with the inner shaft 10. The connecting stud 16 passes through an extended opening 17 located in the hollow driving shaft 2 to permit the stud 16 movement with respect to the axis of the hollow shaft 2. The axial positioning of the inner shaft 10 is caused by a controlling mechanism which engages the outer or free end of the inner shaft 10.

Rotatably positioned on ring 9 is a disc 18 which has connected to its outer circumference a wall member 8. The wall member 8 is connected to the housing 5 by means of a wrinkled shell or bellows member 7.

In the region between the housing 5 and the wall member 8 is a fixed quantity of high viscosity oil. The oil can be, for example, a silicone oil with a viscosity of 200 to 1000 centistokes. This quantity of oil is measured so that it will form an oil ring during operation of the clutch which is located within the area of the outer circumference or region of the housing 5 and the wall member 8. The oil located in this outer region will move between the opposing surfaces of the driving disc 4 and the wall member 8 as the wall member 8 is moved toward the driving disc 4. The drag effect between the driving disc 4 and the wall member 8 is caused by the operation of the driving disc 4 on the oil in the region between opposing surfaces of the driving disc 4 and wall member 8 which moves the wall member 8 and the housing 5 connected to the wall member 8.

The amount of drag $t$ can be calculated from the formula $$t = \eta \frac{w_0}{h}$$

where $t$ represents the drag, $\eta$ the dynamic viscosity of the oil, $w_0$ the relative speed between the opposing surfaces and $h$ the distance between the opposing surfaces.

From the drag, it is possible to calculate the amount of power transmitted through the clutch given by the formula $$P = t.F$$

where $F$ represents the whole extent of surface on which the drag effect operates.

During operation of the clutch, the axial motion of the wall member 8 together with the movement of the wrinkled shell 7 causes oil surface 11 of the high viscosity oil to move radially towards and away from the inner shaft 2 from the region where it is located between the outer circumference of the housing 5 and the wall member 8. This movement of the oil surface 11 causes changes in the amount of surface area covered by the oil and thus causes changes in the transmitted torque.

In accordance with the drawing, it is clear that the disc 4 cooperates with the axially immovable inner wall of the housing. Understandably the construction could be changed so as to fix or fasten a disc to this inner wall of the housing which would cause rotation of the housing 5 due to the drag effect of the driving disc 4.

As seen by the drawing, the disc 4 is provided with a conical portion in the region of its outer circumference. This conical portion decreases the outer diameter of the clutch and the necessary axial movement of the inner shaft 10 provides a control over the whole general area.

The amount of wetted surface portion is changed by the radial and not linear movement of the free inner oil surface 11. This can be expressed by the formula for the ring-shaped surface area.

$$F = \frac{\pi}{4}(D^2 - d^2)$$

wherein D represents the outer diameter of the wetted surface and $d$ represents the inner diameter of said wetted surface.

The frequently desired linear control characteristic can be reached by increasing the distance between the driving disc 4 and the adjacent axially immovable housing wall from the inner diameter to the outer diameter.

With fans in which the torque falls off in proportion to the second power of the rotational speed, the increase in distance follows the form of a hyperbola since the required energy decreases after the third power.

In clutches for driving a fan, suitably the axially movable wall member 8 is also formed as a curve in cross-section which departs from the adjacent surface of the disc 4 radially outgoing from the outer circumference of the wall member 8. Through this configuration of the axially movable wall member 8 nearly a linear regulating characteristic will be achieved.

In constructions in which merely a radially outwardly extending increase in distance occurs between the driving disc and the adjacent axially immovable wall member of the housing, the conical area of the driving disc may, of course, have the form of a curve in cross-section, while the adjacent wall is formed straight-lined in cross-section. Furthermore, one could also have both adjacent surfaces formed in a curve which are separated from each other in the radial direction.

The described hydraulic clutch will always operate at a minimum rotational speed since prior to the machine parts coming to a rest the driving disc 4 would immerse in the formed oil pump and cause the clutch housing to follow. The minimum rotational speed is about the speed which is necessary to exert the centrifugal force required for the formation of the oil ring.

In many cases however it is desirable to bring to a rest position moving machine portions. This can be achieved by having the axial movable wall 8 engage in its most outwardly displaced position, as is shown in the bottom portion of the drawing, a stationary clutch member, whereby a locking is effected.

For this purpose the axially movable wall 8 is provided with a conical portion 19 which engages a corresponding fixed cone 20 which is integrally connected to the pillar 1.

In order to actuate the clutch an ordinary control linkage can be provided which acts on the outer end of the inner shaft 10. Said linkage can be operated by hand or provided with automatic control which operates in response to the temperature changes in a radiator or heat exchanger should the driven mechanism of the hydraulic clutch be provided with a fan.

The inner shaft 10 can also be directly operated by a temperature actuated member such as by the bellows of a thermostat as is shown in the drawing. The front end of bellows 21 rests against the front end of the inner shaft 10 and the pressure fluid is supplied to the bellows by means of pipe 22.

In the borehole in which the inner shaft 10 is situated, a spring 23 is provided which has one end pressed against a fixed abutment located in the borehole. The other end of the spring is pressed against the adjacent front end of the inner shaft 10. This spring urges the inner shaft 10 to move outwardly in the direction of its outer end so that there is always a return of the inner shaft to its original position to enable the pressure control member to operate on the inner shaft 10 once again. The spring 23 also provides the force necessary to lock the hydraulic clutch in its end position by means of brake members 19, 20.

It should be readily apparent from this disclosure that the driving portion can be reversed and made to operate as the driven portion by the operation of the fan as a driving force so as to cause driving of the wall member 8 which now acts as the driving member for the disc 4.

It will be obvious to those skilled in the art that various changes may be made without departing from the spirit of the invention and therefore the invention is not limited to what is shown in the drawing and described in the specification, but only as indicated in the appended claims.

What is claimed is:

1. A hydraulic clutch device for the transmission of power comprising, in combination, a housing; a first rotatable member axially immovable with respect to said housing, and a second rotatable member, each rotatable member mounted substantially coaxial with respect to the other within said housing, the second rotatable member forming a wall of said housing, driving means for rotating said first rotatable member, a quantity of liquid disposed between said rotatable members for actuating rotation of said second rotatable member upon rotation of said first rotatable member, the quantity of said liquid being measured so that it will form an oil ring during rotation of said rotatable members, means for axially moving said second rotatable member with respect to said first rotatable member and said housing, sealing means between said housing and said second rotatable member, the distance between said housing and the first rotatable member at the outer periphery increasing radially outwardly in such a manner that the face of one of these members which is adjacent the other member diverges from said other member in hyperbolic function.

2. A hydraulic clutch as claimed in claim 1, characterized in that the first rotatable member is provided with a conical portion at its outer periphery, said conical portion extending in a direction towards said second rotatable member.

3. A hydraulic clutch as claimed in claim 2, characterized in that the second rotatable member is provided at its outer periphery with a cross-section corresponding to a hyperbolic function, the distance between said second member and the conical portion of said first rotatable member increasing radially inwardly corresponding to said hyperbolic function.

4. A hydraulic clutch as claimed in claim 2, characterized in that the cross-section of the housing at the area of the conical portion of said first rotary member is made so as to correspond to a hyperbolic function, the distance between the housing and the first rotatable member increasing radially outwardly corresponding to said hyperbolic function.

5. A hydraulic clutch as claimed in claim 1, characterized by providing a bellows member as sealing means.

6. A hydraulic clutch as claimed in claim 1, characterized in that a fan is provided on said housing.

(References on following page)

References Cited by the Examiner

UNITED STATES PATENTS

| | | | |
|---|---|---|---|
| 1,238,098 | 8/17 | Brinton | 192—58 |
| 1,761,694 | 6/30 | Sweet | 192—58 X |
| 1,862,802 | 6/32 | Pope | 192—58 |
| 2,015,626 | 9/35 | Heath | 192—58 X |
| 2,838,244 | 6/58 | Oldberg | 123—41.12 |
| 2,879,755 | 3/59 | Weir | 192—58 |
| 2,988,188 | 6/61 | Tauschek | 192—58 XR |
| 3,019,875 | 2/62 | Fowler | 192—58 |

RICHARD B. WILKINSON, *Primary Examiner.*

THOMAS HICKEY, KARL J. ALBRECHT, *Examiners.*